United States Patent
Leimer

(10) Patent No.: US 7,889,780 B2
(45) Date of Patent: Feb. 15, 2011

(54) METHOD OF ESTIMATING DOPPLER SPREAD AND SIGNAL-TO-NOISE RATIO OF A RECEIVED SIGNAL

(75) Inventor: Donald Leimer, Rancho Palos Verdes, CA (US)

(73) Assignee: Sirf Technology, Inc., San Jose, CA (US)

( * ) Notice: Subject to any disclaimer, the term of this patent is extended or adjusted under 35 U.S.C. 154(b) by 977 days.

(21) Appl. No.: 11/619,178

(22) Filed: Jan. 2, 2007

(65) Prior Publication Data
US 2007/0183485 A1    Aug. 9, 2007

Related U.S. Application Data

(60) Provisional application No. 60/756,013, filed on Jan. 4, 2006.

(51) Int. Cl.
*H04B 1/00*    (2006.01)
(52) U.S. Cl. .................. 375/147; 375/136; 375/142; 375/150; 375/316; 375/346; 375/354
(58) Field of Classification Search .................. 375/147, 375/346, 354, 136, 142, 150, 316
See application file for complete search history.

(56) References Cited

U.S. PATENT DOCUMENTS

| 6,411,892 | B1 | 6/2002 | Van Diggelen |
| 6,417,801 | B1 | 7/2002 | Van Diggelen |
| 6,429,814 | B1 | 8/2002 | Van Diggelen et al. |
| 6,453,237 | B1 | 9/2002 | Fuchs et al. |
| 6,484,097 | B2 | 11/2002 | Fuchs et al. |
| 6,487,499 | B1 | 11/2002 | Fuchs et al. |
| 6,510,387 | B2 | 1/2003 | Van Diggelen |

(Continued)

OTHER PUBLICATIONS

Pauluzzi, David R., "A Comparison on SNR Estimation Techniques for the AWGN Channel," IEEE Transactions on Communications; vol. 48, No. 10, pp. 1681-1691 (Oct. 2000).

(Continued)

*Primary Examiner*—Ted M Wang
(74) *Attorney, Agent, or Firm*—Thomas, Kayden, Horstemeyer & Risley, LLP

(57) ABSTRACT

A method for estimating a Doppler spread and a signal-to-noise ratio of a received signal includes: (a) calculating one or more functions of a carrier component of the received signal at a first time point relative to a pilot signal embedded in the received signal; (b) Calculating the one or more functions of the carrier component of the received signal at a second time point relative to the pilot signal; (c) repeating steps (a) and (b) over multiple time periods, each time period being substantially longer than the second time, and accumulating the one or more functions for the first time points and the second time points; and (d) Deriving the Doppler spread and the signal-to-noise ration based on the accumulated one or more functions calculated at the first and second time points. In one embodiment, the first time point is substantially closer to the pilot signal than the second time point. The first time point is one symbol interval from the pilot signal.

19 Claims, 1 Drawing Sheet

U.S. PATENT DOCUMENTS

| | | | |
|---|---|---|---|
| 6,542,820 | B2 | 4/2003 | LaMance et al. |
| 6,560,534 | B2 | 5/2003 | Abraham et al. |
| 6,606,346 | B2 | 8/2003 | Abraham et al. |
| 6,704,651 | B2 | 3/2004 | Van Diggelen |
| 6,778,130 | B1 | 8/2004 | Bevan et al. |
| 6,922,452 | B2 | 7/2005 | Sandberg |
| 7,054,394 | B2 * | 5/2006 | Moser ................. 375/343 |
| 7,304,912 | B2 * | 12/2007 | Gendron ................. 367/135 |
| 2003/0095529 | A1 | 5/2003 | Petre |
| 2005/0105647 | A1 | 5/2005 | Wilhelmsson |

OTHER PUBLICATIONS

Simon, S.K. and Mileant, A., "SNR Estimation for the Baseband Assembly," Telecommications and Data Acquistion Prog. Rep. 42-85 Jet Propulsion Lab, Pasadena, CA (May 15, 1986).

Shah, B. and Hinedi, S., "The Split Symbol Moments SNR Estimator in Narrowband Channels," IEEE Transactions on Aerospace Electronic Systems; vol. AES-26, pp. 737-747 (Sep. 1990).

DVB-T/H OFDM signal, "ETSI EN 300 744, vl. 5.1., Digital Video Broadcasting (DVB); Framing structure, channel coding and modulation for digital terrestrial television, European Telecomminications Standards Institute, Jun. 2004."

International Search Report and Written Opinion, Oct. 19, 2007.

* cited by examiner

METHOD OF ESTIMATING DOPPLER SPREAD AND SIGNAL-TO-NOISE RATIO OF A RECEIVED SIGNAL

CROSS-REFERENCE TO RELATED APPLICATIONS

The present application is related to and claims benefit of priority of U.S. provisional application, entitled "Method of Estimating Doppler Spread and Signal-to-Noise Ratio of a Received Signal," Ser. No. 60/756,013, filed on Jan. 4, 2006. The provisional application is hereby incorporated by reference in its entirety.

BACKGROUND OF THE INVENTION

1. Field of the Invention

The present invention relates to signal processing techniques. In particular, the present invention relates to estimating Doppler spread and signal-to-noise ratio (SNR) of a received signal.

2. Discussion of the Related Art

In many communication systems, the received signal often includes a training sequence or a pilot subcarrier. For example, DVB-T/H OFDM signals are examples of such signals. In such systems, it is desirable to estimate both the Doppler spread and SNR of the received signal. The estimated Doppler spread and SNR are used to select optimum values of reception and demodulation parameters that accommodate channel conditions change.

In an article by David R. Pauluzzi, "A Comparison of SNR Estimation Techniques for the AWGN Channel", IEEE Transactions on Communications; Vol. 48, No. 10, pp. 1681-1691 (Oct. 2000), numerous methods for estimating the SNR of single-carrier signals in additive white Gaussian noise (AWGN) channels are discussed. These methods can be extended to estimate the SNR of an OFDM signal by treating the OFDM signal as a collection of single-channel signals. Likewise, some of these methods may be extended to estimate the SNR in Rayleigh fading channels, using an appropriately small time interval to estimate the signal statistics. The split-symbol moment estimator is particularly suited for this approach. See, e.g., S. K. Simon and A. Mileant, "SNR Estimation for the Baseband Assembly"; Telecommunications and Data Acquisition Prog. Rep. 42-85 Jet Propulsion Lab., Pasadena, Calif. (May 15, 1986); and B. Shah and S. Hinedi, "The Split Symbol Moments SNR Estimator in Narrowband Channels"; IEEE Transactions on Aerospace Electronic Systems; Vol. AES-26, pp. 737-747 (September 1990). U.S. Pat. No. 6,922,452 to Sandberg describes a method for estimating Doppler spread on a single-channel signal by computing the autocorrelation of the received signal and relating its first zero-crossing to the Doppler spread bandwidth. While this method could be applied to individual subcarriers of an OFDM signal, the computation and storage requirements are excessive for a mobile receiver that must consume a minimum of power.

SUMMARY

According to one embodiment of the present invention, a method for estimating a Doppler spread and a signal-to-noise ratio of a received signal includes: (a) calculating one or more functions of a carrier component of the received signal at a first time point relative to a pilot signal embedded in the received signal; (b) Calculating the one or more functions of the carrier component of the received signal at a second time point relative to the pilot signal; (c) repeating steps (a) and (b) over multiple time periods, each time period being longer than the second time, and accumulating the one or more functions for the first time points and the second time points; and (d) Deriving the Doppler spread and the signal-to-noise ration based on the accumulated one or more functions calculated at the first and second time points. In one embodiment, the first time point is substantially closer to the pilot signal than the second time point. The first time point is one symbol interval from the pilot signal. In one embodiment, a product of the Doppler spread and the time difference between the first time point and the second time is approximately 0.25.

According to one embodiment of the present invention, the one or more functions may be an even-symmetric linearity function of a sum of the carrier component and the pilot signal. The one or more functions may also be an even-symmetric linearity of a difference between the carrier component and the pilot signal. The even-symmetric linearity may be an absolute value function, or a squaring function. The time domain representation of the received signal may be a sum of the transmitted signal and noise, a Rayleigh faded continuous wave signal or the Jake's model.

The present invention provides a method for estimating simultaneously Doppler spread and signal-to-noise ratio (SNR) of a received signal. According to one embodiment of the present invention, the method computes a loss in signal coherence over two different values of time intervals.

The present invention is better understood upon consideration of the detailed description below and the accompanying drawings

BRIEF DESCRIPTION OF THE DRAWINGS

The present invention is illustrated by way of example, and not limitation, in the figures of the accompanying drawings, in which.

DETAILED DESCRIPTION

Figure 1:
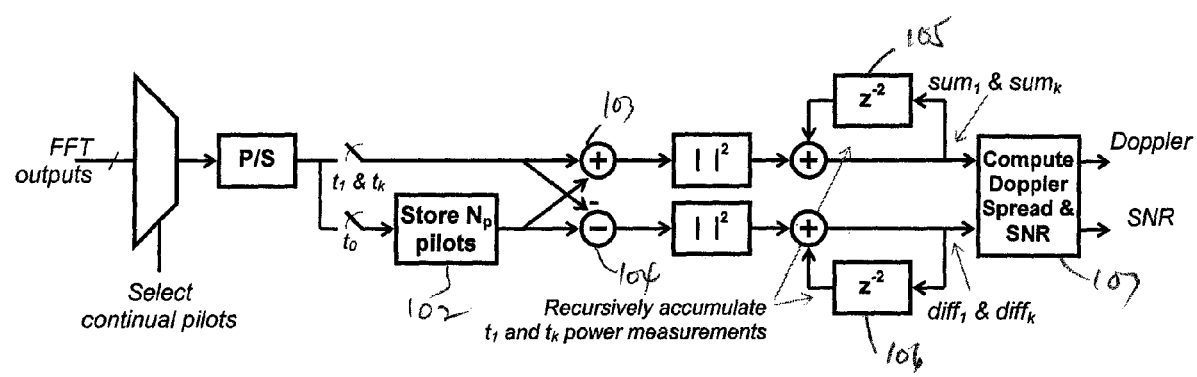
FIG. 1 illustrates a process for determining the Doppler spread and the SNR of a DVB-T/H OFDM signal, in accordance with embodiment of the present invention.

The present invention provides methods for simultaneously estimating the Doppler spread and SNR of a received signal by computing the loss in signal coherence over two different values of time intervals. Suitable signals for the present method includes a DVB-T/H OFDM signal, as defined in "ETSI EN 300 744, v1.5.1, Digital Video Broadcasting (DVB); Framing structure, channel coding and modulation for digital terrestrial television, European Telecommunications Standards Institute, 2004-06." While the present methods are applicable to any communication system that transmits a known signal such as a training sequence or a pilot subcarrier, a particular application to DVB-T/H OFDM signals is provided in this detailed description to illustrate the present methods. The Doppler spread and SNR may be estimated simultaneously to select optimum values of reception and demodulation parameters of a receiver to accommodate channel conditions change. The methods of the present invention avoid the cost of computing a number of complex-valued autocorrelations by simply computing the amplitude of autocorrelation at two different time offsets and jointly solving for the received SNR and the bandwidth of the Doppler spread.

Algorithms discussed in this detailed description are self-consistent sequences of steps which may represent physical manipulations of physical quantities of electrical or magnetic signals in the form of bits, values, elements, symbols, characters, terms, or numbers.

One embodiment of the present invention is illustrated in the following. Often, a mobile communications receiver receives a signal that has arrived from a single transmitter via multiple propagation paths. Each path may represent reflections of the signal by one or more reflectors. The combined sum of the many signals arriving along independent paths may exhibit Rayleigh fading. A Doppler effect may also result from the relative motions between the reflectors, the receiver, and the transmitter. When the path lengths vary independently, a different Doppler effect may affect the different signal components. Consequently, the combined sum of all signal components may exhibit a continuum of Doppler effects, referred to as a "Doppler spread."

According to the well-known Jakes' model, a Rayleigh faded continuous wave (CW) signal has a power spectrum, given by:

$$S(f) = A \frac{3/2\pi}{\sqrt{f_D^2 - (f - f_C)^2}}$$

where $f_D$ is the maximum Doppler shift, $f_c$ is the frequency of the CW signal, and A is the mean power of the faded signal. The corresponding autocorrelation function is given by:

$$E\langle s(t)s^*(t-\tau)\rangle = AJ_0(2\pi f_D \tau)$$

where $J_0$ is the $0^{th}$ order Bessel function of the first kind.

If the Doppler spread is known, the receiver's demodulation and decoding performance may be optimized to reduce communication errors. For example, the channel estimation procedure for OFDM reception may be improved based on the Doppler spread spectrum. Similarly, the equalizer adaptation bandwidth for single-carrier reception may also be adjusted according to the Doppler spread. The SNR may also be used in the receiver to adjust response times and to properly weight information used in decoding decisions.

In accordance with one embodiment of the present invention, the SNR is estimated from the signal and noise powers of the subcarriers with known modulation. For a DVB-T/H OFDM signal, the continuous pilots may be used for this purpose. In a single-channel system (e.g., UMTS WCDMA), a pilot channel may be used for this purpose. After removing the known modulation, the phase of each subcarrier is continuous, and symbol pairs can be coherently summed and differenced to determine the signal and noise powers. As the time interval between the pair of symbols is increased, the signal loses phase coherence due to Doppler spread, which affects the signal and noise powers. The power measurements at two different time intervals between symbol pairs may then be used to determine jointly both the SNR and Doppler spread.

Figure 2:
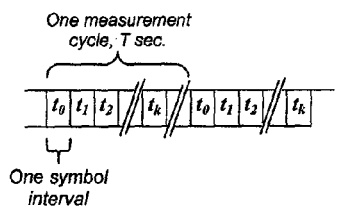
FIG. 2 shows the locations of symbol intervals in a measurement cycle used in this example.

FIG. 1 illustrates a process for determining the Doppler spread and the SNR of a DVB-T/H OFDM signal, in accordance with embodiment of the present invention. FIG. 2 shows the locations of symbol intervals in a measurement cycle used in this example As shown in FIG. 1, at step 101, the received signal is down-converted from a radio frequency, sampled, and transformed by an fast fourier transform (FFT) to recover the OFDM subcarriers. In a DVB-T/H signal, Np of the subcarriers are continual pilots, which are each modulated to a known phase modulation in each symbol interval. The continual-pilot subcarriers are processed serially. At $N_c$ subsequent measurement cycles, at symbol interval $t_0$, the complex subcarrier values of the $N_p$ continual pilots are stored (step 102). At symbol intervals $t_1$ and $t_k$ of each measurement cycle, the subcarriers are summed and differenced with the subcarrier values that are stored from symbol interval $t_0$ (steps 103 and 104, respectively) and accumulated (steps 105 and 106). In this embodiment, $t_0$ and $t_1$ are adjacent symbol intervals. The powers of the sum and differences may be computed from a squaring operation, or any even-symmetric nonlinearity (e.g., an absolute value). The accumulated sums and differences are provided by:

$$sum_1 = \frac{1}{N_c N_p} \sum_{m=1}^{N_c} \sum_{n=1}^{N_p} |r_n(t_0 + mT) + r_n(t_1 + mT)|^2$$

$$diff_1 = \frac{1}{N_c N_p} \sum_{m=1}^{N_c} \sum_{n=1}^{N_p} |r_n(t_0 + mT) - r_n(t_1 + mT)|^2$$

$$sum_k = \frac{1}{N_c N_p} \sum_{m=1}^{N_c} \sum_{n=1}^{N_p} |r_n(t_0 + mT) + r_n(t_k + mT)|^2$$

$$diff_k = \frac{1}{N_c N_p} \sum_{m=1}^{N_c} \sum_{n=1}^{N_p} |r_n(t_0 + mT) - r_n(t_k + mT)|^2$$

where $r_n(t)$ is the complex-valued FFT output for the $n^{th}$ subcarrier, and T is the measurement cycle longer than k+1 symbol intervals, as shown in FIG. 2.

Each subcarrier output $r_n(t)$ may be modeled by the sum of a continual pilot $s_n(t)$ and noise $n_n(t)$:

$$r_n(t) = s_n(t) + n_n(t)$$

Thus, the mean values of the sum and difference measurements are $$E\langle sum_k \rangle = E\langle |s_n(t_0) + n_n(t) + s_n(t_k) + n_n(t)|^2 \rangle$$
$$= E\langle |s_n(t_0)|^2 + |s_n(t_k)|^2 + |n_n(t_0)|^2 + |n_n(t_k)|^2 + 2|s_n(t)s_n^*(t)|\rangle$$
$$= 2S(1 + |J_0(2\pi f_D \tau_k)|) + 2N$$

$$E\langle diff_k \rangle = E\langle |s_n(t_0) + n_n(t) - s_n(t_k) - n_n(t)|^2 \rangle$$
$$= E\langle |s_n(t_0)|^2 + |s_n(t_k)|^2 + |n_n(t_0)|^2 + |n_n(t_k)|^2 - 2|s_n(t)s_n^*(t)|\rangle$$
$$= 2S(1 - |J_0(2\pi f_D \tau_k)|) + 2N$$

where S is the mean power of the subcarrier signal, N is the power of the additive noise, and $\tau_k$ is the correlation lag between $t_0$ and $t_k$.

The mean values of $sum_1$, $diff_1$, $sum_k$, and $diff_k$ may be arithmetically combined in numerous ways to extract information about the Doppler spread $f_D$ and signal-to-noise ratio S/N. In one embodiment, the Doppler spread is determined from the ratio:

$$\frac{sum_k - diff_k}{sum_1 - diff_1} = \frac{4S|J_0(2\pi f_D \tau_k)|}{4S|J_0(2\pi f_D \tau_1)|}$$

which can be then be used to numerically solved for the Doppler spread $f_D$. The computed error is low when $\tau_1$ is one symbol interval and $\tau_k$ is chosen such that the product $f_D \times \tau_k$ is approximately 0.25. (Actually, any positive value may be used in theory; however, values less than unity are preferred.) Similarly, the SNR value S/N may be determined from the ratio:

$$\frac{sum_1 - diff_1}{2diff_1} = \frac{4S|J_0(2\pi f_D \tau_1)|}{4S(1 - |J_0(2\pi f_D \tau_1)|) + 4N}$$

Thus, methods for simultaneously estimating the Doppler spread and SNR of a received signal (e.g., a DVB-T/H OFDM signal) using the loss in signal coherence over two different values of time intervals have been described.

The above detailed description is provided to illustrate the specific embodiments of the present invention and is not intended to be limiting. Numerous variations and modifications within the scope of the present invention are possible. The present invention is set forth in the following claims.

I claim:

1. A method for estimating a Doppler spread and a signal-to-noise ratio of a signal, comprising:
   (a) Receiving the signal in a receiver to determine a carrier component of the signal;
   (b) Calculating loss in coherence of the carrier component at a first time point relative to a pilot signal embedded in the received signal;
   (c) Calculating loss in coherence of the carrier component of the received signal at a second time point relative to the pilot signal;
   (d) Repeating steps (b) and (c) over multiple time periods, each time period being longer than the second time, and accumulating the loss in coherence for the first time points and the second time points; and
   (e) Deriving the Doppler spread and the signal-to-noise ratio based on the accumulated loss in coherence calculated at the first and second time points.

2. A method as in claim 1, wherein the first time point is substantially closer to the pilot signal than the second time point.

3. A method as in claim 2, wherein the first time point is one symbol interval from the pilot signal.

4. The method of claim 1, wherein a product of the Doppler spread and the time difference between the first time point and the second time point is a positive value.

5. The method of claim 4, wherein the positive value is approximately 0.25.

6. The method of claim 4, wherein the positive value is less than or equal to 1.0.

7. The method of claim 1, wherein calculating the loss in coherence comprises an even-symmetric linearity function of a sum of the carrier component and the pilot signal.

8. The method of claim 1, wherein calculating the loss in coherence comprises an even-symmetric linearity of a difference between the carrier component and the pilot signal.

9. The method of claim 1, wherein calculating the loss in coherence comprises an even-symmetric linearity of an absolute value function.

10. The method of claim 1, wherein calculating the loss in coherence comprises an even-symmetric linearity of a squaring function.

11. The method of claim 1, wherein the time domain representation of the received signal comprises a sum of the transmitted signal and noise.

12. The method of claim 1, wherein the received signal is modeled as a Rayleigh faded continuous wave signal.

13. The method of claim 1, wherein the loss in coherence is provided by Jake's model.

14. A method for estimating doppler spread and signal-to-noise ratio, comprising:
   means for receiving a signal and for determining a carrier component of the signal;
   means for calculating loss in coherence of the carrier component at a first time point relative to the pilot signal;
   means for calculating loss in coherence of the carrier component at a second time point relative to the pilot signal;
   means for calculating an accumulated loss in coherence for the first time point and the second time point over a period of time intervals; and
   means for deriving the doppler spread and signal-to-noise ratio based on the accumulated loss in coherence.

15. The method of claim 14, further comprising means for selecting an optimum value for reception based on the derived Doppler spread and signal-to-noise ratio.

16. The method of claim 14, further comprising means for determining the first time point that is substantially closer to the pilot signal than the second time point.

17. The method of claim 14, further comprising means for determining the loss in coherence by an even-symmetric linearity function.

18. The method of claim 14, further comprising means for receiving a signal modeled as a Rayleigh faded continuous wave.

19. The method of claim 14, further comprising means for determining loss in coherence provided by Jake's model.

* * * * *